Feb. 8, 1949.  C. J. COBERLY, JR  2,460,874
METHOD OF MAKING TOOL HANDLES
Filed July 21, 1944
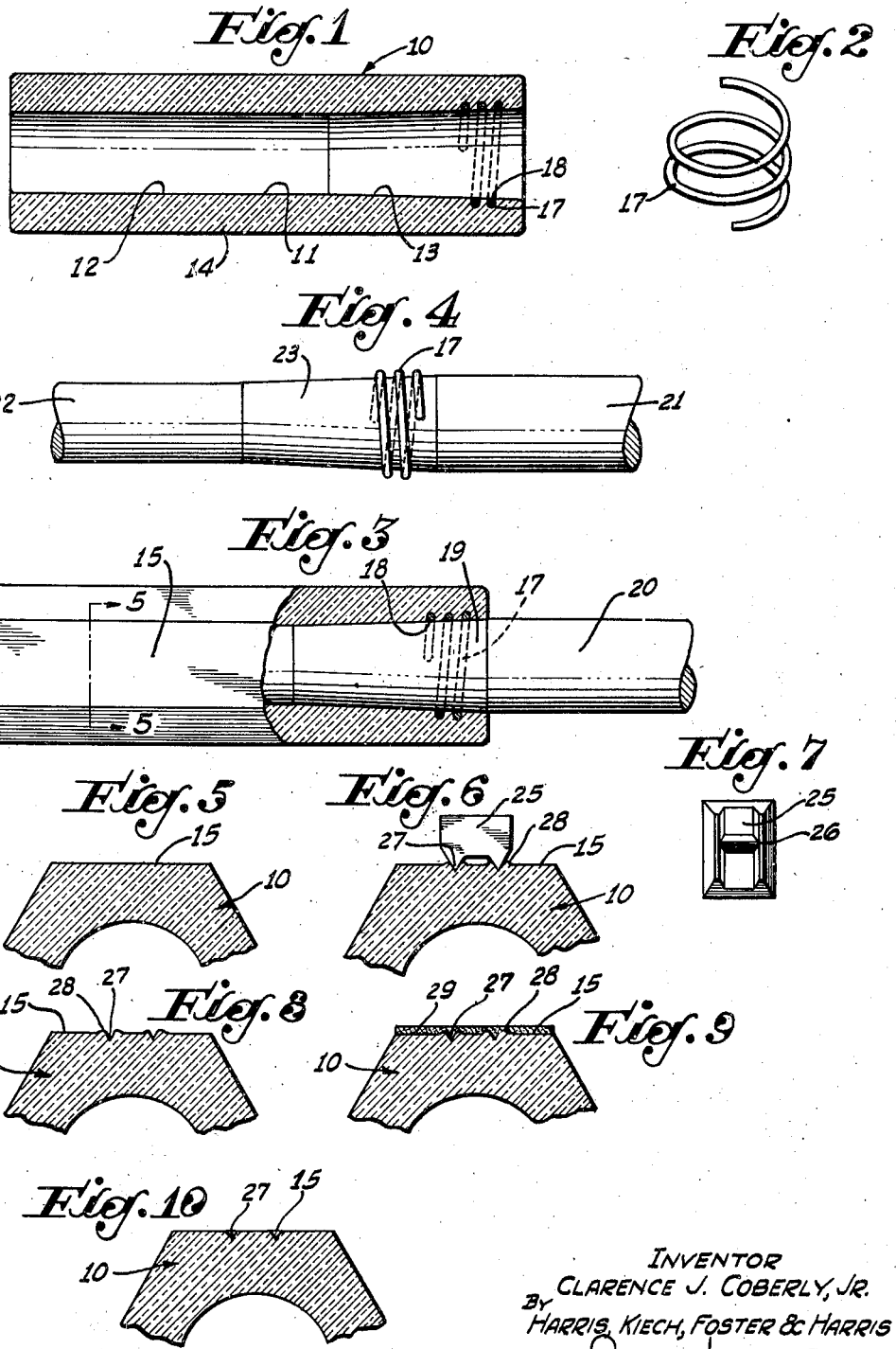
INVENTOR
CLARENCE J. COBERLY, JR.
BY HARRIS, KIECH, FOSTER & HARRIS
FOR THE FIRM
ATTORNEYS Patented Feb. 8, 1949

2,460,874

UNITED STATES PATENT OFFICE 2,460,874

METHOD OF MAKING TOOL HANDLES

Clarence J. Coberly, Jr., San Marino, Calif., assignor, by mesne assignments, to Kobe, Inc., Huntington Park, Calif., a corporation of California Application July 21, 1944, Serial No. 546,029

3 Claims. (Cl. 18—59)

My invention relates to the art of making plastic objects. It is particularly applicable to the making of tool handles of plastic material, and will be described in connection therewith, although I do not desire to be limited to the preferred embodiment described hereinafter, as the invention has other applications, as will be understood by those skilled in the art.

Tool handles are commonly made of wood or metal with a conical bore into which the shank of the tool to be held is driven to secure the handle to the tool. Attempts in the art to utilize plastic materials, such as Bakelite, cellulose acetate, or the like, in the manufacture of such tool handles have not been successful, because of the characteristics of such materials. As is well known, plastic materials may be selected for widely different characteristics. Thus, relatively soft plastics are available, which have high resistance to breakage through fracture, but such materials have the tendency to "flow" when exposed to prolonged pressure engagement with metals. If such a plastic material is used for a tool handle for a tool having a metal shank to be inserted into the holder, continued use of the tool causes the shank to enlarge gradually the receiving opening in the holder, due to "flow" of the plastic material under pressure exerted thereon by the shank, with the result that the shank becomes loose in the holder and they tend to separate. On the other hand, if a plastic material is selected which is hard enough to resist this tendency to "flow," it is ordinarily quite brittle, and the tool shank cannot be driven into the handle without a high percentage of breakage of handles made from such a relatively hard plastic material. Thus, attempts to use plastic materials for tool handles into which the metal shank of a tool is to be driven have not been successful.

It is therefore a primary object of my invention to provide a tool handle of relatively hard plastic material into which the metal shank of a tool can be forcibly driven without breaking the handle, and so as to retain the shank in the handle under all normal conditions of use. I accomplish this by molding into the plastic material of the handle a coil of spring wire axially aligned with the tool receiving bore of the handle, so as to reinforce the handle against breakage in assembly. This coil of spring wire, I have discovered, must have substantially more than one complete turn thereof, and preferably should have more than two complete turns, embedded in the plastic material of the handle.

I have also discovered that it is desirable in such a handle as described above to embed the coil of spring wire in the plastic material of the handle so that the inner face of the coil is substantially in the plane of the bore of the handle, so as to effectively grip the tool shank when it is driven into the bore, and this is another object of my invention.

In attempting to mold an annular reinforcing element into the wall of a tubular tool handle formed of plastic material, I have experienced difficulty in holding the reinforcing element in the desired position during the molding operation. I obviate this difficulty by using a coil of spring wire, as described above, which is snugly placed on a mandrel before molding, the tension in the wire causing it to retain its desired position on the mandrel during the molding operation, and this is a further object of my invention. This expedient also insures that the inner wall of the coil is in substantially the same plane as the bore of the handle, which is an additional advantage of the invention.

Another reason why plastic materials are not widely used in the manufacture of tool handles for precision tools is that it is difficult and expensive with known processes to permanently print identification marks on such materials, to identify the tool or instrument retained by the handle. It is therefore another object of the invention to provide a simple and economical method of permanently fixing identification marks, or in fact any printing, on a plastic material. I accomplish this by pressing a hot die into the surface of the material to form indentations of desired configuration, painting the whole surface with a suitable paint and so as to fill the indentations, and then removing the paint and the beads formed by the hot die from the surface of the material, to leave only the indentations filled with the paint. This method is extremely fast, cheap, and forms permanent identification marks which are plainly visible and do not readily wear off through use due to the fact that they are below the surface of the material and are thus protected from abrasion and other wear.

Other objects and advantages of my invention will appear from the following specification and from the drawing, which is for illustrative purposes only and in which:

Fig. 1 is a longitudinal sectional view through my complete tool holder.

Fig. 2 is a perspective view of the coil of spring wire used in the invention.

Fig. 3 is a longitudinal view, partly in section, showing my tool handle with a tool shank therein.

Fig. 4 is a view illustrating the first step of the method of my invention.

Fig. 5 is an enlarged fragmentary cross-sectional view taken on the line 5—5 of Fig. 3.

Fig. 6 is a view illustrating the first step of the printing method of my invention.

Fig. 7 is a bottom view of a die used in my printing method.

Fig. 8 is a view illustrating the effect of the first step of my printing method.

Fig. 9 is a view illustrating a further step of my printing method.

Fig. 10 is a view illustrating the result of my printing method.

Referring to the drawing, Fig. 1 shows a tool handle 10, of generally tubular construction, provided with a bore 11 composed of a cylindrical portion 12 and a frusto-conical portion 13, the exterior 14 of which is preferably hexagonal in form, as partially shown in Fig. 5, to provide a series of flat faces 15. Obviously, the tool handle 10 may be made of any desired shape without departing from the spirit of my invention. The tool handle 10 may be made of any suitable plastic material, such as, for example, one of the Vinylite resins, which is sufficiently hard to insure against substantial flowing of the material in use, as will be indicated more fully hereinafter.

Embedded in the plastic material of the tool handle 10, and adjacent one end thereof, is a coil 17 preferably formed of spring wire. It is essential that the coil 17 be formed of more than one complete turn of spring wire so as to provide a continuous circular reinforcement for more than one complete turn about the frusto-conical portion 13 of the bore 11, and I prefer to utilize approximately two and one-half turns of wire in the coil 17 to avoid any possibility of fracture of the tool handle 10. More turns may be employed in the coil 17, but are unnecessary and merely add to the expense of the construction. As will be noted, the inner face 18 of the coil 17 is approximately in the plane of the frusto-conical portion 13 of the bore 11, and this is an important feature of the invention.

As illustrated in Fig. 3, the frusto-conical end 19 of a metal tool shank 20 is driven into the frusto-conical portion 13 of the bore 11 so as to tightly engage therein. The inner face 18 of the coil 17 engages the face of the metal tool shank 20 to prevent the tool shank from being driven into the tool handle 10 far enough to fracture the tool handle, which is preferably of relatively brittle material to insure against "flow" thereof, and the coil also acts as a reinforcement for the plastic material of which the handle is made. Tool handles made and applied in the manner described form a secure and relatively permanent connection with the metal shank of a tool, and there is little tendency, even after prolonged use by careless workmen, for the tool handles to loosen and fall off the tool shanks.

It is common practice in the art to mold tubular plastic objects upon a mandrel, and I propose to follow this general practice, the tool handle 10 being molded on a mandrel 21, as illustrated in Fig. 4 and as is well known in the art. Before molding, however, my invention contemplates that the coil 17 be placed on the mandrel 21 in the position illustrated in Fig. 4, in which it snugly engages the mandrel. To accomplish this, the coil 17 need only be slid onto the mandrel over its small end 22 and onto the frusto-conical portion 23 thereof, being moved onto the mandrel until the turns of the coil are slightly expanded, as illustrated. The exact position of the coil 17 on the mandrel 21 is not critical, and this preliminary step may be readily and quickly carried out by unskilled workmen. The tool handle 10 is then molded around the mandrel 21 so as to embed the coil 17 in the inner wall of the tool handle, as illustrated, the general molding process being old and well known in the art. Since the coil 17 is slid onto the mandrel to the position in which it snugly engages the mandrel, the spring action of the coil retains it in the desired position on the mandrel during the molding operation, and no difficulty is experienced in forming the finished product as illustrated in Fig. 1. If the coil 17 has been slid farther onto the mandrel 21 than is illustrated in Fig. 4, before molding, in the finished product, obviously, it will be nearer the end of the tool handle 10 than illustrated in Fig. 1, but this does not affect the operation or function of the device. Thus, there is considerable leeway in fabrication as to the exact position of the coil 17 on the mandrel 21 for molding. Another advantage of my method is that by using a coil of spring wire, the coil can readily be distorted into the frusto-conical shape desired. Although I prefer to use a coil of spring wire, such as the coil 17, I do not desire to be limited thereto, as obviously functionally equivalent coils can be substituted therefor without departing from the spirit of my invention.

Figs. 5 to 10, inclusive, illustrate the method by which I print identifying indicia on one of the faces 15 of the tool handle 10. Such indicia are normally in the form of words and numerals, but for simplicity I have shown in Fig. 7 a die 25 having raised portions 26 adapted to form the letter "H." The die 25 is first heated to a temperature which will cause the plastic material of which the tool handle 10 is formed to flow and is then pressed onto the flat face 15 of the tool handle, as illustrated in Fig. 6, to form indentations 27 therein. When the die 25 contacts the plastic material forming the tool handle 10, the material flows to permit entrance of the die thereinto and forms small raised beads 28 around the die on the surface of the flat face 15. Fig. 8 illustrates the condition of the surface after the die 25 has been removed therefrom, showing the indentations 27 and the beads 28. As shown in Fig. 9, the flat surface 15 is then entirely covered with a paint, preferably of a color contrasting with that of the material of the tool handle 10, to form a paint layer 29 thereon, which also fills the indentations 27. After the paint layer 29 has fully dried, the paint layer together with the beads 28 are removed in any suitable manner, as by buffing, to leave the flat face 15 in the condition shown in Fig. 10, in which the face 15 is again flat but has indented therein the indentations 27 filled with paint, which makes the lines formed by the die clearly visible. By filling depressed lines with paint, in this manner, the paint does not wear off through handling, and is relatively permanent.

Although I have shown and described a preferred embodiment of my invention, it will be understood that certain features, elements, and steps thereof are merely representative of others which may be substituted therefor, and consequently I do not intend to be limited to the exact disclosure, but desire to be afforded the full protection of the following claims.

I claim as my invention:

1. A method of forming a plastic article, including the steps of: forcing a coil of spring wire axially on a tapered mandrel so as to cause said coil to expand radially at a point where the coil snugly and inherently engages the mandrel; and molding a wall of plastic material around said coil and said mandrel so as to form a relatively hard plastic element having a bore of substantially the same diameter as said mandrel and having said coil embedded therein with the ends of said coil spaced from the ends of said bore.

2. A method of forming a plastic article, including the steps of: forcing a coil of spring wire axially onto a frusto-conical mandrel to cause said coil to expand radially until the inner wall of all of the turns of the coil snugly engages the mandrel so as to inherently hold said coil in position on said mandrel; and molding a wall of plastic material around said coil and said mandrel so as to form a plastic element having a frusto-conical bore of substantially the same configuration as the external surface of the mandrel and having said coil embedded therein with the ends of said coil spaced from the ends of said bore.

3. A method of forming a device of the character described, including the steps of: axially forcing a coil of spring wire on a tapered mandrel to cause said coil to expand radially to a point where said coil snugly and inherently engages said mandrel with the inner wall of said coil in contact therewith; molding a wall of plastic material around said coil and said mandrel to provide a plastic element having a bore of substantially the same diameter as said mandrel and having said coil embedded therein with the ends of said coil spaced from the ends of said bore; and axially sliding said plastic element from said mandrel.

CLARENCE J. COBERLY, Jr.

REFERENCES CITED

The following references are of record in the file of this patent:

UNITED STATES PATENTS

| Number | Name | Date |
|---|---|---|
| 425,357 | Wendlinger | Apr. 8, 1890 |
| 1,037,759 | Haskins | Sept. 3, 1912 |
| 1,207,397 | Greengood | Dec. 5, 1916 |
| 1,589,913 | Wells | June 22, 1926 |
| 1,606,680 | Wisner | Nov. 9, 1926 |
| 1,650,307 | Temple | Nov. 22, 1927 |
| 1,800,254 | Holmes | Apr. 14, 1931 |
| 1,830,141 | Stone | Nov. 3, 1931 |
| 1,919,816 | Wiegand | July 25, 1933 |
| 2,106,186 | Mulholland | Jan. 25, 1938 |
| 2,208,494 | Broderson | July 16, 1940 |
| 2,345,749 | Hohwart | Apr. 4, 1944 |
| 2,378,901 | Amrhein et al. | June 26, 1945 |